(12) United States Patent
Englander et al.

(10) Patent No.: US 9,211,840 B1
(45) Date of Patent: Dec. 15, 2015

(54) MIRROR MOUNTING ARM ASSEMBLY WITH REINFORCEMENT BRIDGE

(75) Inventors: Benjamin Englander, Woodmere, NY (US); Julian Serer, Plainview, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

(21) Appl. No.: 13/491,224

(22) Filed: Jun. 7, 2012

Related U.S. Application Data

(60) Provisional application No. 61/494,120, filed on Jun. 7, 2011.

(51) Int. Cl.
*B60R 1/02* (2006.01)
*B60R 1/06* (2006.01)

(52) U.S. Cl.
CPC .................. *B60R 1/0605* (2013.01); *B60R 1/02* (2013.01); *B60R 1/06* (2013.01)

(58) Field of Classification Search
CPC .......... B60R 1/02; B60R 1/06; B60R 1/0605; B60R 1/0607; B60R 1/0617; B60R 1/064; B60R 1/066; G02B 7/182; B02B 7/1825; A47G 1/16; A47G 1/1653
USPC .................. 248/466, 475.1, 476, 479, 220.21, 248/220.22, 309.1, 289.11, 900; 359/841, 359/871, 872; D12/187
See application file for complete search history.

(56) References Cited

U.S. PATENT DOCUMENTS

| | | | |
|---|---|---|---|
| 2,411,421 A * | 11/1946 | Golden | ....................... 248/475.1 |
| 3,081,057 A | 3/1963 | Farnsworth | |
| 3,142,469 A | 7/1964 | Clemmer | |
| 3,168,277 A | 2/1965 | Stewart | |
| 2,596,632 A | 7/1966 | Whitehead | |
| 3,259,349 A | 7/1966 | Lee | |
| 3,260,490 A | 7/1966 | Trautner | |
| 3,372,897 A | 3/1968 | Lee | |
| 3,395,883 A | 8/1968 | Murgas | |
| 3,415,481 A | 12/1968 | Greenfield | |
| 3,424,424 A | 1/1969 | Kelly | |
| 3,482,811 A | 12/1969 | Zent | |
| 3,501,122 A | 3/1970 | Barker | |
| 3,601,938 A | 8/1971 | Loomis | |
| 3,608,856 A | 9/1971 | Hurley | |
| 3,729,163 A | 4/1973 | Cummins | |
| 3,778,016 A | 12/1973 | Gernhardt et al. | |
| 3,831,896 A | 8/1974 | Owens | |
| 4,073,461 A | 2/1978 | Lopez et al. | |
| 4,158,451 A | 6/1979 | Lukey | |
| 4,187,702 A | 2/1980 | Benton | |
| 4,368,868 A | 1/1983 | Urban | |
| 4,441,682 A | 4/1984 | Su | |
| 4,500,063 A | 2/1985 | Schmidt et al. | |
| 4,512,634 A | 4/1985 | Stout | |
| 4,815,836 A * | 3/1989 | Byers et al. | ................. 248/475.1 |
| 4,830,326 A | 5/1989 | Schmidt et al. | |
| 4,905,954 A * | 3/1990 | Taylor | ......................... 248/475.1 |

(Continued)

*Primary Examiner* — Jonathan Liu
*Assistant Examiner* — Guang H Guan
(74) *Attorney, Agent, or Firm* — Stroock & Stroock & Lavan LLP

(57) ABSTRACT

A mirror mounting assembly for mounting a mirror to a vehicle includes a mounting bracket including a mirror pivot mechanism pivotally accommodating a mirror mounting arm carrying the mirror; a mounting support bracket configured to connect to a first structural portion of the vehicle, and to said mounting bracket; and a reinforcement bracket configured to connect to a second structural portion of the vehicle and providing support to the mounting support bracket.

23 Claims, 12 Drawing Sheets

(56) References Cited

U.S. PATENT DOCUMENTS

| | | | |
|---|---|---|---|
| 4,951,913 A * | 8/1990 | Quesada | 248/485 |
| 5,025,543 A * | 6/1991 | Byers et al. | 29/401.1 |
| 5,060,905 A * | 10/1991 | Sharp | 248/479 |
| 5,106,049 A * | 4/1992 | Schmidt et al. | 248/487 |
| 5,116,013 A | 5/1992 | Malcolmson | |
| 5,301,060 A * | 4/1994 | Niikawa et al. | 359/218.1 |
| 5,316,257 A | 5/1994 | Schmidt et al. | |
| 5,433,417 A | 7/1995 | Schmidt et al. | |
| D366,235 S * | 1/1996 | Schmidt et al. | D12/187 |
| 5,576,899 A * | 11/1996 | Englander | 359/871 |
| 6,361,178 B1 | 3/2002 | Lang et al. | |
| 6,398,375 B1 | 6/2002 | Englander | |
| 6,883,923 B2 | 4/2005 | Englander | |
| 6,962,420 B2 | 11/2005 | Branham | |
| 7,252,398 B2 * | 8/2007 | Englander | 359/841 |
| 7,290,891 B2 * | 11/2007 | Englander | 359/841 |
| 8,333,479 B2 | 12/2012 | Englander | |
| 8,517,331 B2 * | 8/2013 | Roberts et al. | 248/479 |
| 2010/0226026 A1 | 9/2010 | Englander | |

* cited by examiner

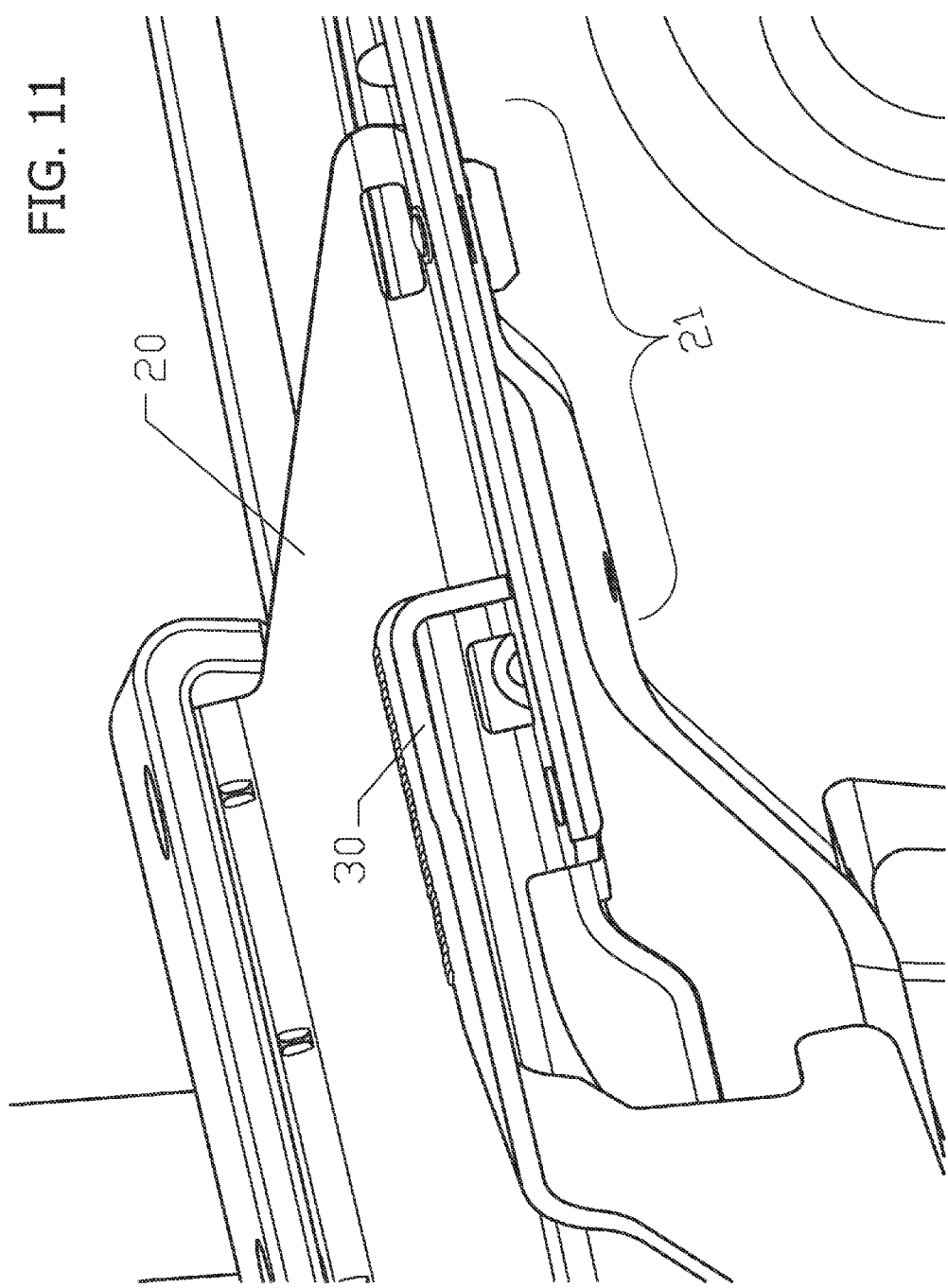

MIRROR MOUNTING ARM ASSEMBLY WITH REINFORCEMENT BRIDGE

RELATED APPLICATIONS

This application claims priority to U.S. Provisional Application No. 61/494,120, filed on Jun. 7, 2011, entitled: Mirror Mounting Arm Assembly With Reinforcement Bridge, and which is hereby incorporated by reference in its entirety.

BACKGROUND OF THE INVENTION

1. Field of the Invention

The present invention generally relates to a mounting assembly for mounting a mirror to a motor vehicle.

2. Description of the Background Art

Side view mirrors which are used on buses and trucks are evidenced by U.S. Pat. Nos. 3,395,883, 4,368,868, 4,500,063, 4,512,634, 5,106,049 and 5,316,257, the contents of which are incorporated by reference herein.

Detachable mirrors are also known, as evidenced by U.S. Pat. No. 3,395,883. This mounting utilizes a clamp that engages around the lip of the wheel well of the vehicle and feet that contact the inner face of the fender edge forming the engine compartment. The feet are held in place by tension generated by a rubber element that extends between the feet at the engine compartment and the clamp at the wheel well. The problem with this type of device is that it is easily removed and is thus subject to theft. Furthermore, since the mounting arms are mounted to the body panel there is also the problem of vibrations being amplified by the mounting arms.

SUMMARY OF THE INVENTION

Various embodiments for mirror mount assemblies for supporting a mirror are provided. In addition, various alternative methods of installing mirror mount assemblies are also provided.

In some embodiments, a mirror mounting assembly for mounting a mirror to a vehicle includes a mounting bracket including a mirror pivot mechanism pivotally accommodating a mirror mounting arm carrying the mirror, a first connection area, and a second connection area; a mounting support bracket having a third connection area configured to connect said mounting support bracket to a first structural portion of the vehicle, a fourth connection area configured to connect to the first connection area of said mounting bracket, and a fifth connection area; and a reinforcement bracket comprising a sixth connection area configured to connect to the fifth connection area of the mounting support bracket, and a seventh connection area configured to connect to a second structural portion of the vehicle.

In some embodiments of the mirror mounting assembly, the mounting bracket further comprises a front portion, a left side wall, a right side wall, a top wall, and a bottom wall, wherein the front portion, side walls, top wall and bottom wall together form a concave back portion, and wherein the concave back portion is generally shaped to the contour of a portion of a fender of the vehicle. In some embodiments of the mirror mounting assembly, the top wall of the mounting bracket comprises the first connection area, and the front portion comprises the mirror pivot mechanism.

In some embodiments of the mirror mounting assembly, the mounting support bracket comprises a substantially elongated shape, a proximal end and a distal end, and the third connection area is located at least one of at the proximal end and at the distal end of the mounting support bracket. In some embodiments of the mirror mounting assembly, the fourth connection area comprises a flange extending substantially laterally from a side of the mounting support bracket in a direction of an outer side of the structural portion of the vehicle, the flange is positioned and configured so as to be insertable into the back portion of the mounting bracket and the fourth connection area is fastenable to an underside of the top wall at the first connection area.

In some embodiments of the mirror mounting assembly, the reinforcement bracket comprises at least a first reinforcement segment and a second reinforcement segment, the sixth connection area of the reinforcement bracket comprising at least a portion of the second reinforcement segment and the seventh connection area comprising at least a portion of the first reinforcement segment; and the sixth connection area is positioned to be connectable with the fifth connection area of the mounting support bracket and the seventh connection area is positioned to be connectable to the second structural portion of the vehicle. In some embodiments of the mirror mounting assembly, the first and second reinforcement segments are substantially perpendicular in orientation, the reinforcement bracket further comprises at least a third reinforcement segment, the third reinforcement segment being substantially parallel to the first reinforcement segment, and the sixth connection area comprises at least a portion of the second and third reinforcement segments.

In some embodiments of the mirror mounting assembly, the first and second reinforcement segments are substantially perpendicular in orientation, the reinforcement bracket further comprises at least a third reinforcement segment, the third reinforcement segment being substantially parallel to the second reinforcement segment, and the sixth connection area comprises at least a portion of the second and third reinforcement segments. In some embodiments, the mirror mounting assembly further comprises a first fastener configured to connect the first connection area to the fourth connection area, a second fastener configured to connect the third connection area to the first structural portion of the vehicle, and a third fastener configured to connect the seventh connection area to the second structural portion of the vehicle. In some embodiments, the mirror mount assembly further comprises a fourth fastener configured to connect the second connection area to a portion of the fender of the vehicle.

In some embodiments of the mirror mounting assembly, the mounting support bracket and the reinforcement bracket are at least one of integral, welded and permanently connected to one another. In some embodiments of the mirror mounting assembly, the mounting support bracket further comprises an eighth connection area configured to connect said mounting support bracket to at least one of the first structural portion of the vehicle and a third structural portion of the vehicle.

In some embodiments of the mirror mounting assembly, wherein the vehicle includes: at least one of discrete, skeletal and contiguous structural portions, a hood movably connected to the vehicle, the hood movable between an open and close position, and at least one fender secured to the vehicle by at least one mounting section, and wherein the mirror assembly includes a mirror arm assembly including a first end and a second end, a mirror element being connected to the first end, a mounting bracket including or connected to a mirror pivot mechanism, a first connection area, and a second connection area, the mirror pivot mechanism being connected to the second end of the mirror arm assembly; a mounting support bracket having a third connection area configured to connect said mounting support bracket to a first structural portion of the vehicle, a fourth connection area configured to connect to the first connection area of said mounting bracket, and a fifth connection area; a reinforcement bracket comprising a sixth connection area configured to connect to the fifth connection area of the mounting support bracket, and a seventh connection area configured to connect to a second structural portion of the vehicle, a method of installing the mirror assembly comprises at least one of opening the hood of the vehicle to the open position and removing the hood from the vehicle; connecting the fifth connection area of the mounting support bracket to the sixth connection area of the reinforcement bracket; connecting the first connection area of the mounting bracket to the fourth connection area of the mounting support bracket; configuring the mounting bracket so that the mounting bracket engages, and is in conformance with, at least a portion of a shape of the fender of the vehicle, and configuring the third connection area of the mounting support bracket to be substantially coextensive with a first mounting section of the first structural portion of the vehicle such that the fourth connection area is substantially near an outer side of the structural portion of the vehicle. The method further comprises configuring the reinforcement bracket so that the seventh connection area is substantially coextensive with a second structural portion of the vehicle; connecting the third connection area with the at least first mounting section of the first structural portion of the vehicle; connecting the seventh connection area to the section structural portion of the vehicle; and connecting the second connection area of the mounting bracket to at least a portion of the fender of the vehicle.

In some embodiments a method of installing a mirror assembly comprises connecting a mounting support bracket to a reinforcement bracket; connecting a mounting bracket to the mounting support bracket; configuring the mounting bracket so that the mounting bracket engages, and is in conformance with, at least a portion of a shape of the fender of the vehicle, and configuring the mounting support bracket to be substantially coextensive with a first structural area of the vehicle; configuring the reinforcement bracket to be substantially coextensive with a second structural area of the vehicle; connecting the mounting support bracket to the first structural portion of the vehicle; connecting the reinforcement bracket to a second structural portion of the vehicle; and connecting the mounting bracket to at least one of: a portion of the fender of the vehicle and through an exterior portion of the fender of the vehicle to another connection area.

In some embodiments, a mirror mounting assembly for mounting a mirror to a vehicle includes a mounting bracket including a mirror pivot mechanism pivotally accommodating a mirror mounting arm carrying the mirror; a mounting support bracket configured to connect to a first structural portion of the vehicle, and to said mounting bracket; and a reinforcement bracket configured to connect to a second structural portion of the vehicle and providing support to said mounting support bracket. In some embodiments of the mirror mounting assembly, the mounting bracket further comprises a front portion, a left side wall, a right side wall, a top wall, and a bottom wall, wherein the front portion, side walls, top wall and bottom wall together form a concave back portion, and wherein the concave back portion is generally shaped to the contour of a portion of a fender of the vehicle.

In some embodiments of the mirror mounting assembly, the mounting support bracket comprises a substantially elongated shape, an upper portion comprising a flange, and lower portion; and the flange extends substantially laterally from a side of the mounting support bracket in a direction of an outer side of the structural portion of the vehicle, the flange is positioned and configured so as to be connectable to a portion of the mounting bracket; and the lower portion is positioned and configured so as to be connectable to the second structural portion of the vehicle. In some embodiments of the mirror mounting assembly, the reinforcement bracket comprises at least a first reinforcement segment and a second reinforcement segment, the first reinforcement segment being connectable to the mounting support bracket and the second reinforcement segment being connectable to a second structural portion of the vehicle.

In some embodiments the mirror mounting assembly further comprises a first fastener configured to connect the mounting bracket to the mounting support bracket, a second fastener configured to connect the mounting support bracket to the first structural portion of the vehicle, a third fastener configured to connect the reinforcement bracket to the second structural portion of the vehicle, and a fourth fastener configured to connect the mounting bracket to a portion of a fender of the vehicle. In some embodiments of the mirror mounting assembly, the mounting support bracket and the reinforcement bracket are at least one of integral, welded and permanently connected to each other. In some embodiments of the mirror mounting assembly, the mounting support bracket is further configured to connect said mounting support bracket to at least one of a second area along the first structural portion of the vehicle and a third structural portion of the vehicle.

BRIEF DESCRIPTION OF THE DRAWINGS

FIG. 11 is a side view a portion of an exemplary embodiment of a mirror mount assembly according to some embodiments of the invention.

DETAILED DESCRIPTION OF THE INVENTION

Figure 1:
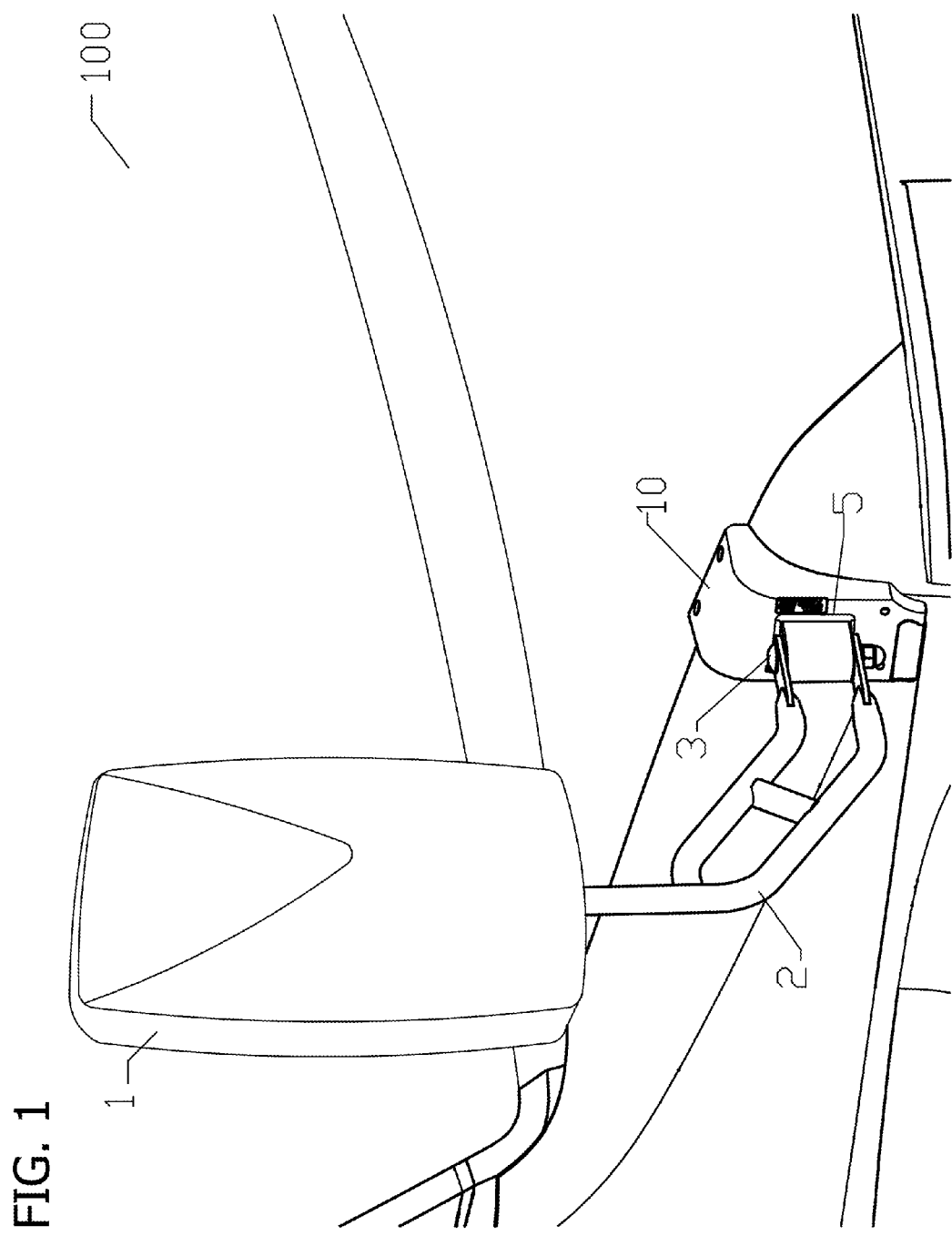
FIG. 1 illustrates a first exemplary embodiment of the mirror mounting assembly according to some embodiments of the invention.

Before explaining at least one embodiment of the invention in detail, it is to be understood that the mirror mounting arm assembly with reinforcement bridge of the present invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. Moreover, certain features which are well known in the art are not described in detail in order to avoid complication of the subject matter of the present invention.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of assembly and/or construction for the described mechanisms may be altered so that certain assemblies/processes are conducted in parallel or independent, with other assemblies/processes, to the extent that the processes are not dependent upon each other. Thus, the specific order of steps and/or functions described herein is not to be considered implying a specific sequence of steps to perform the process. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Further, it will be understood that the word mirror refers generally to any optical apparatus (e.g., mirrors, reflectors, signs, camera domes, other optically sensitive applications, etc.).

Various embodiments for mirror mount assemblies for supporting a mirror are provided. In addition, various alternative methods of installing and/or constructing mirror mount assemblies are also provided.

FIG. 1 illustrates a mirror mounting arm assembly 100 with reinforcement bridge (not shown) in accordance with one embodiment of the present invention, shown mounted on the passenger's side of a vehicle. Additionally and/or alternatively, the mirror assembly 100 may be mounted on other portions of the vehicle including, but not limited to, the driver's side or the rear of the vehicle. For example, the mirror assembly 100 may be mounted on the door of the vehicle, the body, the chassis, or any other portion of the vehicle that may be advantageous to the desired mirror application using a variety of mounting options, such as screws, glue, mounting tape, and the like. The mirror assembly 100 may optionally be mounted on various types of vehicles including but not limited to commercial, industrial, or passenger vehicles.

As can be seen in FIG. 1, a first exemplary embodiment of the inventive mirror mounting assembly 100 shows a mirror 1, a mirror arm 2, and a mounting bracket 10, fastened to a vehicle with the use of a mounting support bracket (see FIG. 2), a reinforcement bridge (see FIG. 2) and at least one connection device (not shown), such as, for example, one or more bolts and/or screws.

In alternative embodiments, additional or fewer connection devices, bolts and/or screws may be used in a variety of different locations to secure the mirror mounting mechanism to the vehicle. In addition, different numbers and/or sizes of screws, bolts, washers, springs, bushings, clamps, plungers, grooves, ferrules, rivnuts, plusnuts, hexnuts, and/or tubes, or any other suitable connection device or method may optionally be used.

The embodiment of FIG. 1 shows the mirror arm 2 mounted to a mirror pivot mechanism 3 integrated into mounting bracket 10. In other embodiments any other suitable mechanism for attaching mirror arm 2 to mirror pivot mechanism 3 and/or mounting bracket 10 may be used, including stationary mounts, sliding mounts, hinged mounts, etc. In addition, the specific location of the mounting of the mirror pivot mechanism, mirror arm and/or mounting bracket may be varied with respect to each other.

In alternative embodiments, different shaped components and/or different mounting mechanisms may optionally be used in accordance with the features or elements of the present invention. For example, in alternative embodiments, a F-shaped tubular mirror arm may be used having different shapes and/or structures. For example, in place of a tube, a more square like configuration or other shaped mounting mirror arm may optionally be used. In addition, in alternative embodiments, the present invention can be used in a standalone mounting solution that only requires attachment to the vehicle in one location and/or multiple locations. For example, instead of a F-loop mirror arm configuration, a standalone mounting solution for a L-shaped mirror arm, L-shaped mirror arm, or other arm shape can be used. In alternative embodiments, one or more of the bushings, bolts, washers and nuts may be used, or instead, alternative securing mechanisms may be used.

Embodiments of the present invention utilizing an F-shaped mirror arm may further comprise a casing made of metal, plastic, or any other material advantageous to the invention around the mirror arm and/or the exterior housing for protecting the components of the invention.

Figure 2:
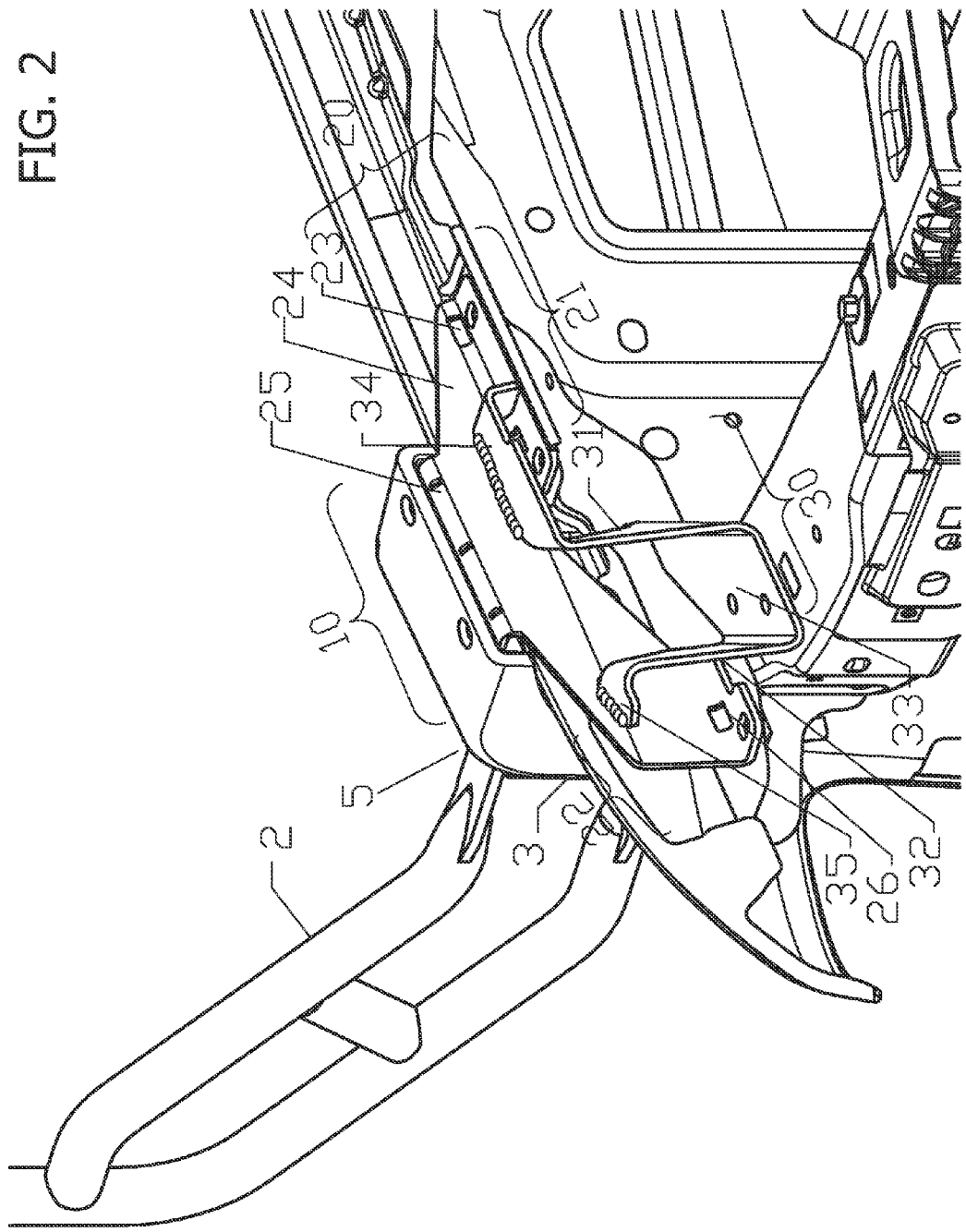
FIG. 2 illustrates a second exemplary embodiment of the mirror mounting assembly according to some embodiments of the invention.

FIG. 2 is an illustration of an embodiment of mirror assembly 100 mounted on a vehicle in accordance with some embodiments of the invention. In some embodiments, mounting bracket 10 is engaged with a mounting support plate or bracket 20, which is mounted to a portion of the vehicle's side fender and/or through the vehicle fender to another element of the vehicle, such as a support structure and/or or skeletal structure providing a location of reduced vibration. A reinforcement bracket or bridge 30 is mounted to mounting support bracket 20. Mounting support bracket 20 may be rectangular, square, circular, or any other shape suitable for mounting a breakaway assembly such as mirror assembly 100. Mounting support bracket 20 may be metal, or any other material suitable for mounting to the vehicle. Reinforcement bridge 30 may be mounted to mounting support bracket 20 via bolts, screws, nuts, and/or any other suitable connection device, or may be mounted via adhesives, welding, snap-fit or any other method of mounting suitable for the application. One of ordinary skill in the art would appreciate that mounting support bracket 20 may be mounted to the body, fender, chassis, hood, or any other portion of the vehicle suitable for positioning of mirror assembly 100, for example, using an adhesive, bolts, screws, welds, and other standard connection devices. The connection devices may connect to mounting support bracket 20 from the exterior of the vehicle optionally through the fender and/or from the interior of the vehicle body optionally through the fender or any other structural part of the vehicle.

FIG. 2 illustrates the attachment of mounting support bracket 20 to the vehicle, with reinforcement bridge 30 providing additional support according to some embodiments of the invention. Mounting support bracket 20 may include a distal bracket and/or portion 21 which may mount directly onto the vehicle, and a proximal bracket and/or portion 22 for connecting reinforcement bridge 30 to at least one of mounting bracket 10 and/or to another structural portion of the vehicle. Bolts, nuts, welds and/or washers may be used to mount mounting support bracket 20 to the vehicle and/or the reinforcement bridge to the bracket. In alternative embodiments, mounting support bracket 20 may be mounted to the vehicle via bolts, screws, and nuts, or may be mounted via adhesives, welding, snap-fit or any other method of mounting suitable for the application. The distal portion 21 and proximal portion 22 which may mount directly onto the vehicle may optionally be separate portions connected or welded together or a unitary piece of metal. In some embodiments, distal portion 21 and proximal portion 22 may be the same height/width or different heights/widths. Additional details of a mounting support bracket such as mounting support bracket 20 are described in U.S. Pat. No. 7,837,338, incorporated herein by reference.

In alternative embodiments, mirror mounting assembly 100 includes support bracket 10, mounting support bracket 20 configured for attachment to a structural portion, engine bay, reinforced fender, and/or frame of the vehicle inside an engine bay and/or below the hood and/or level of the hood of the vehicle, and reinforcement bridge 30. In some embodiments, lower section 23 is sized and positioned for connection to the structural portion, optionally inside the engine bay and/or below and/or level with the hood of the vehicle and configured to comprise a width sufficient to be connected to the structural portion and/or frame using, for example, at least two bolts. More or less bolts or other connection devices may optionally be used. Additionally or alternatively, lower section 23 may be shaped to maximize surface area connection with the vehicle. For example, lower section 23 may have one or more flanges, for example, flanges 26, set at differing altitudes, levels, angles, or in different locations along the fender in accordance with the shape of the fender.

In alternative embodiments, upper section 24 is sized and configured to support a support member 25 which supports mirror mounting bracket 10. In some embodiments, support member 25 may be welded and/or otherwise fastened to mounting support bracket 20. In some embodiments, mounting support bracket 20 is molded with support member 25 as one single piece. Mounting bracket 10 includes pivot element 3 sized and configured to be connected to, and pivotally support, mirror 1 (see FIG. 1), and to be supported by a fender portion of the vehicle. In some embodiments, support member 20 includes an outer fender support section (not shown) having a first leg supporting a mounting bracket such as mounting bracket 10, and a second leg on which pivot element 3 is coupled thereto. In some embodiments, the first and second legs of the support member are optionally configured to be shaped in a contour that substantially conforms to the contour of the fender portion of the vehicle, where in some embodiments the first leg supports the mirror mounting bracket resting on, and being supported by, a top of the fender portion. In addition, in some embodiments, the second leg extends downwardly along and resting on the side of the fender portion.

In some embodiments, support member 25 is substantially in the shape of an inverted L, but may alternatively be in any shape suitable to support mounting bracket 10. In some embodiments, lower and upper sections 23 and 24 are connected together and/or form a unitary bracket or support that is in the shape of an L, Z, V and/or other suitable shape. In addition or alternatively, in some embodiments, the first and/or second leg (not shown) may optionally be connected to the vehicle directly with or via the fender portion of the vehicle. In some embodiments, the first and/or second leg are not included, provided mirror assembly 100 is sufficiently supported without them. In some embodiments, distal and/or proximal portions 21 and 22, and/or lower and/or upper section 23 and 24, may be tapered inwardly and/or outwardly for connection to at least one of the structural portion, in or near the engine bay and/or below or level with the hood of the vehicle, and/or for connection to a bracket and/or vehicle structure. In some embodiments, the first leg, second leg, lower section 23 and/or upper section 24 comprises a width sufficient to be connected to the structural portion or other stable area of the vehicle and/or skeletal structure using at least two bolts, thereby providing stability for the mirror in the longitudinal direction of the vehicle. In some embodiments, a barrier member (not shown) is mounted to a surface of support member 25 facing the fender portion of the vehicle for added stability. The overall mounting assembly advantageously reduces vibrations on the mirror.

In some embodiments, reinforcement bridge 30 is used in combination with the mirror mounting arm assembly for additional stability. In some embodiments, the arm assembly may not be necessary due to the added stability afforded by reinforcement bridge 30. Reinforcement bridge 30, which can be seen in more detail in FIGS. 8A-8G, advantageously provides additional support for the mounting mechanism described herein, and can be attached to a structural portion of the vehicle, including for example, the radiator support structure, the engine bay, and/or any other location below the hood. In addition, reinforcement bridge 30 may be connected to and/or abut against the first portion of the support structure, or any other suitable portion, for added support.

In some embodiments, bolts, nuts, welds, adhesives and/or washers may be used to mount reinforcement bridge 30 to mounting support bracket 20 and/or the vehicle. In alternative embodiments, a primary or first reinforcement portion 31 and/or a secondary or second portion 32, which may mount directly onto the vehicle may optionally be separate portions connected by a base portion 33 as a unitary piece of metal, welded together, or otherwise connected. In some embodiments, first and/or second reinforcement portions 31 and 32 may be generally triangularly shaped to provide outward horizontal support to mounting support bracket 20, while simultaneously garnering vertical upward support from a support structure below, such as, for example, when fastened to a radiator support. Alternatively, in some embodiments first and/or second reinforcement portions 31 and 32 may be any suitable shape to provide additional support and/or additional connection areas for the mounting bracket to be connected to additional areas of stability and/or structure of the vehicle for support. In some embodiments, first and second reinforcement portions 31 and 32 may be the same shape and/or width or different shapes and/or widths. In some embodiments, first and second reinforcement portions 31 and 32 may be fastened directly to a structural portion of the vehicle. In some embodiments, first and second reinforcement portions 31 and 32 may be connected to the vehicle via base portion 33.

In some embodiments, reinforcement bridge 30 is shaped in any manner that facilitates the support of support bracket 20 and provides sufficient support of support bracket 20. For example, in some embodiments, reinforcement bridge 30 has a U-like shape, wherein first and second reinforcement portions 31 and 32, and base portion 33 comprise the three sides of the U-like shape. In some embodiments, first and/or second reinforcement portions 31 and 32 may include additional wings, as, for example, wings 34 and/or 35. In some embodiments, wings 34 and 35 may be the same length and/or shape, or different lengths and/or shapes to provide maximum support to support bracket 20 and mounting bracket 10. In alternative embodiments, the additional wings are not used. In still further embodiments, reinforcement bridge 30 is shaped, for example, as an L, Z or C. In some embodiments, reinforcement bridge 30 is connected to both support bracket 20 and a portion of the vehicle such as the radiator. In some embodiments, reinforcement bridge 30 is connected to the radiator or other portion of the vehicle, but is not required to be connected to the bracket to provide support. In some embodiments, reinforcement bridge 30 is connected to a radiator portion via any standard connection, such as screws, bolts, washers, springs, bushings, clamps, plungers, grooves, ferrules, rivnuts, plusnuts, hexnuts, and/or tubes, or any other suitable device, adhesives, welds, and the like.

In alternative embodiments, a method of assembling a mirror assembly such as mirror assembly 100 is provided. The vehicle may include: a vehicle bulkhead, frame, support and/or other structural portion; a hood movably connected to the vehicle between an open and a closed position; and at least one fender secured to the vehicle by a plurality of mounting bolts disposed in mounting holes or any other suitable means of fastening to the fender. In some embodiments, the bolts and/or mounting holes may extend in a vertical, horizontal, and/or any suitable direction. Mirror assembly 100 includes mirror 1 (see FIG. 1), mirror arm 2 including a first end and a second end, mirror 1 being connected to the first end, and mounting support 10, including an exterior side 5 and an interior side (see FIG. 5B). In some embodiments, exterior side 5 of mounting support 10 is connected to the second end of mirror arm 2, and the interior side is shaped to conform to an exterior surface of the at least one fender.

In alternative embodiments, the method may include the sequential, non-sequential and/or sequence independent steps of opening the hood to the open position, placing the mounting assembly adjacent to the fender of the vehicle, mounting mounting support bracket 20 to a structural portion and/or under or level with the hood of the vehicle, and mounting reinforcement bridge 30 to a radiator portion, structural portion and/or under or level with the hood of the vehicle. In some embodiments mounting bracket 10 is connected to mounting support bracket 20 prior to installation on the vehicle. In alternative embodiments, mounting support bracket 20 is mounted to the vehicle first and mounting bracket is subsequently mounted to the vehicle and mounting support bracket 20.

Referring again to FIG. 2, in some embodiments, mounting support bracket 20 is provided and bent at an angle so as to form two legs (such as support member 25 and second section 22). Mounting bracket 10 is mounted to one of the legs while the other of the legs is mounted at its free end to at least one support member (such as flange 23 and/or 24). The support member is configured on one side to substantially conform to the shape of the vehicle fender. In some embodiments, mounting support bracket 20 is L-shaped, with a short leg of the L resting on the top of the fender adjacent the engine compartment opening, and the longer leg extending downwardly along the fender of the vehicle. In some embodiments, the short leg of mounting support bracket 20 is attached to mounting bracket 10 with flange 25. The other leg of mounting support bracket 20, second section 22, which optionally projects laterally from the engine compartment, may be smaller than first section 21, which is mounted to the bulkhead, frame, structural portion and/or under or level with the hood, and is of a width sufficient to be connected by two bolts. In some embodiments, second section 22 is optionally tapered from one first section 21 to flange 25. In some embodiments, mounting bracket 10 is fixed to flange 25 of the mounting support bracket 20 via, for example, screwing, gluing, snap fitting, etc. In some embodiments, the wide dimension of first section 21 mounted to the bulkhead provides stability for the mirror in the longitudinal direction of the vehicle.

In some embodiments, mirror arm 2 may be connected by a pin or pivot so that mirror 1 (see FIG. 1) and mirror arm 2 can pivot about a vertical axis. In some embodiments, reinforcement bridge 30 is mounted, for example, to a radiator portion, structural portion and/or under or level with the hood of the vehicle to provide support to the mounting support bracket 20 and mounting bracket 10.

Figure 3:
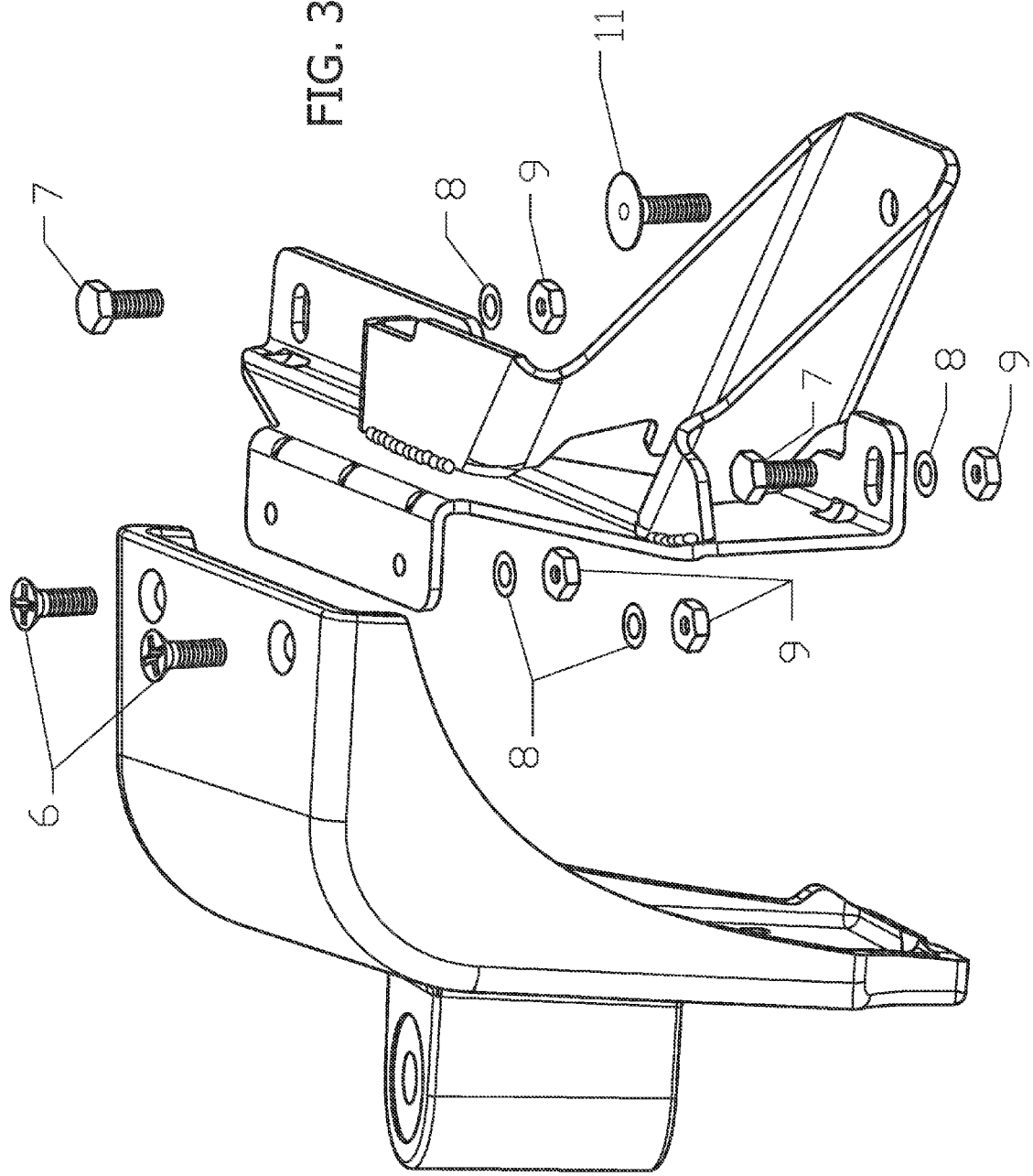
FIG. 3 is an exploded illustration of the mirror mounting assembly according to some embodiments of the invention.

FIG. 3 illustrates a semi-exploded view showing mounting bracket 10 and mounting support bracket 20 separated, while mounting support bracket 20 and reinforcement bridge 30 are connected, according to some embodiments of the invention. FIG. 3 also illustrates trajectories of connection devices which may be used in accordance with some embodiments to fasten portions of mirror assembly 100 to each other and/or to structural portions of the vehicle, such as, for example, screws 6, bolts 7, washers 8, nuts 9, and rivnut 11. It is of course understood that these are merely exemplary in nature, and other connection devices and/or methods of connecting and fastening different parts are also contemplated. In alternative embodiments, additional or fewer connection devices, bolts and/or screws may be used in a variety of different locations to secure the parts to each other and/or to the vehicle.

In addition or alternatively, different numbers and/or sizes of screws, bolts, washers, springs, bushings, clamps, plungers, grooves, ferrules, rivnuts, plusnuts, hexnuts, and/or tubes, or any other suitable connection device or method may optionally be used. In some embodiments, different parts may be fastened together and/or to the vehicle via adhesives, welding, snap-fit or any other method of mounting suitable for the application. In some embodiments, one or more parts as described herein may be formed, cast or molded in one or more contiguous parts, rather than or in addition to being formed as distinct parts.

As an example, in some embodiments, mounting support bracket 20 and reinforcement bridge 30 represent two distinct bracket elements. In alternative embodiments, mounting support bracket 20 and reinforcement bridge 30 can represent two parts of one contiguous bracket or two brackets that have been welded or otherwise permanently fastened together. In alternative embodiments, additional flanges may be employed to facilitate the connection of flange 25 (FIG. 2) to mounting bracket 10 and/or reinforcement bridge 30 and/or flange 25, mounting bracket 10, mounting support bracket 20, and/or reinforcement bridge 30 may include additional sections to facilitate a stable connection.

In alternative embodiments, different support areas or sections of the vehicle that provide support and/or stability, such as structural portions of the vehicle within the engine bay of the vehicle, below the hood of the vehicle and/or other structural sections/supports of the vehicle, including structural supports providing support to the body of the vehicle may be employed to facilitate the connection of mounting bracket 10, mounting support bracket 20, and/or reinforcement bridge 30 to facilitate a stable connection. Also, in alternative embodiments, mounting support bracket 20 and reinforcement bridge 30 can be made of steal, aluminum or any other rigid or semi-rigid material strong enough and durable enough to provide support to mounting bracket 10.

In some embodiments, depending on the particular location where mirror mount assembly 100 is mounted, mirror mount assembly 100 may include multiple support shafts (not shown) of varying lengths. For example, a first connection device may pass below a structural portion of the frame of the vehicle, thus requiring a longer support shaft to secure between a fender portion and another structural portion farther within the vehicle, while a second connection device might pass through a bore in the structural portion of the frame of the vehicle, thus requiring a shorter support shaft. In some embodiments, one or more support shafts may be hollow tubes which allow a connection device such as a screw or bolt to be inserted therethrough.

In some embodiments, a tube or shaft, such as a support shaft, may comprise any form and/or material through which a connection device may pass which provides additional support. For example, a support shaft may comprise a solid structure or material, such as a rod, dowel, brace, rubber stopper, hardening foam, acrylic filler, rubber cement etc., through which a connection device is drilled prior to or at the time of connection, or which is formed around or mounted coextensive with a connection device after fastening.

Figure 4:
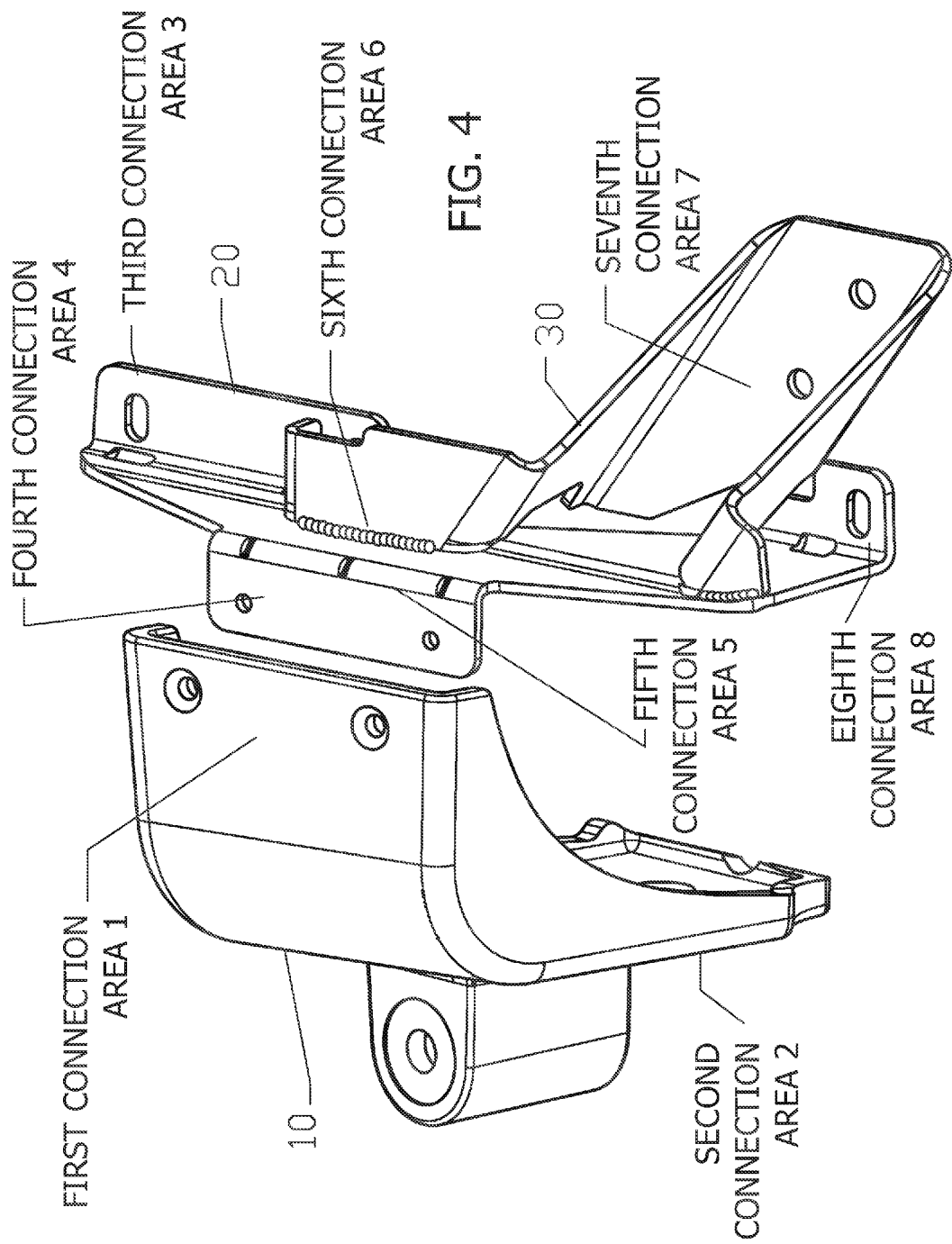
FIG. 4 is an exploded illustration of the mirror mounting assembly according to some embodiments of the invention.

FIG. 4 is a view of portions of mirror assembly 100 illustrating areas for fastening different parts to each other and/or to a vehicle according to some embodiments of the invention. In some embodiments, mounting bracket 10 comprises first connection area 1 and second connection area 2. (See FIGS. 5 and 6 for further details of mounting bracket 10.) First connection area 1 is located at a top wall of mounting bracket 10, and includes, for example, at least two downward-facing apertures configured to receive screws 6 and to be fastenable to a portion of mounting support bracket 20. In alternative embodiments, more than two apertures or less than two apertures may also be used. Second connection area 2 comprises at least one back-facing aperture (see FIG. 5A). In some embodiments, second connection area 2 may be fastened to the vehicle in any manner described herein, or any other suitable manner. In some embodiments, second connection area 2 does not require fastening to the vehicle, but simply abuts the fender of the vehicle for lateral support if necessary.

In some embodiments, mounting support bracket 20 comprises third connection area 3, fourth connection area 4, and fifth connection area 5. In some embodiments, third connection area 3 is configured to connect mounting support bracket 20 to a first structural portion of the vehicle. In some embodiments, fourth connection area 4 is configured to connect to first connection area 1 of mounting bracket 10. In some embodiments, fifth connection area 5 is configured to connect to a portion of reinforcement bridge 30.

In some embodiments, reinforcement bridge 30 comprising a sixth connection area 6 and a seventh connection area 7. In some embodiments, sixth connection area 6 is configured to connect to fifth connection area 5 of mounting support bracket 20, and seventh connection area 7 is configured to connect to a second structural portion of the vehicle, such as, for example, a radiator support.

In some embodiments, mounting support bracket 20 may additionally or alternatively comprise an eighth connection area 8. In some embodiments, eighth connection area 8 is configured to connect mounting support bracket 20 to at least one of the first structural portion and a third structural portion of the vehicle.

Figure 5A:
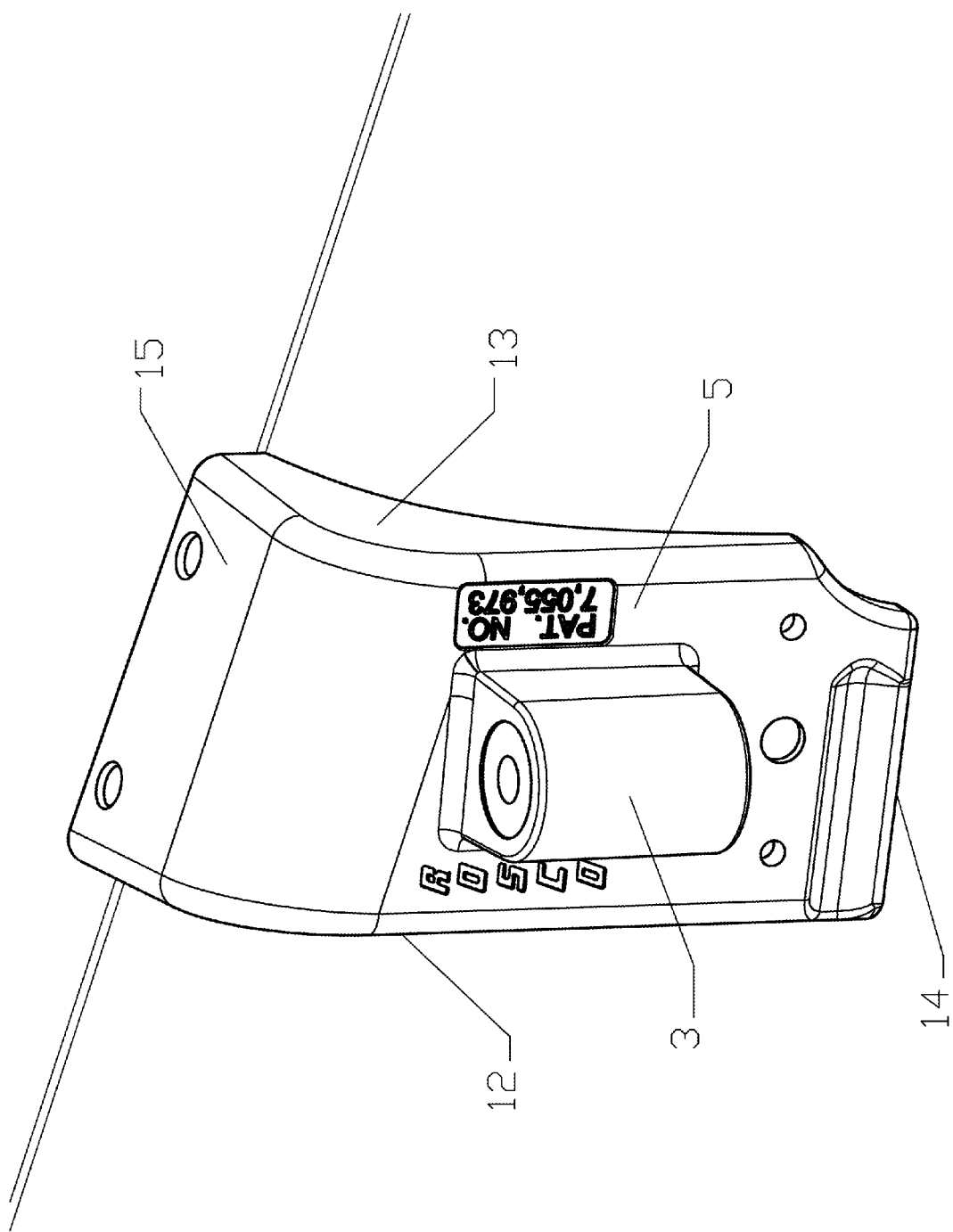
FIGS. 5A-5B illustrate front and rear views of a third exemplary embodiment of a mirror mounting assembly according to some embodiments of the invention.
Figure 5B:
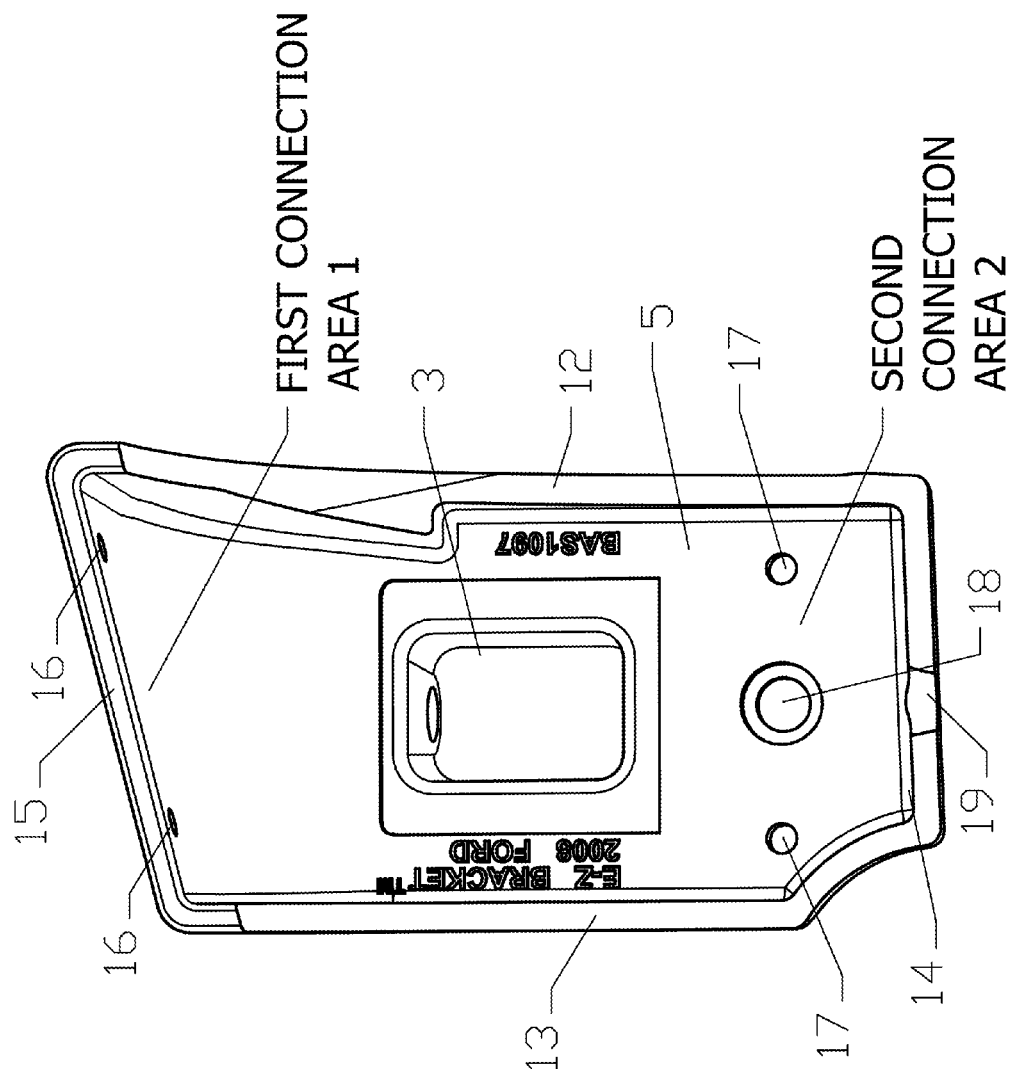

FIGS. 5A-5B are front and rear views respectively of mounting bracket 10 according to some embodiments of the invention. As can be seen in FIG. 5A, in some embodiments mounting bracket 10 has an exterior side 5, a bottom wall 14, a top wall 15, a left wall 12, and a right wall 13. Exterior side 5 can comprise a mirror pivot mechanism, such as mirror pivot mechanism 3. In some embodiments, mirror pivot mechanism 3 is attachable to, and supportive of, a mirror support arm (see also FIG. 1). Additional and/or alternative mirror attachment mechanisms may also be possible, including, for example, stationary mirror attachments, mechanical/motorized attachments, and the like. Additionally, the mirror pivot mechanism 3 can be integral with exterior side 5, permanently welded to exterior side 5 or attached to exterior side 5 via standard connections that may be permanent or temporary.

In some embodiments, bottom wall 14 may be a short lip extending laterally toward the fender, or may not be required depending on the mounting location and angle of mounting exterior side 5 relative to the fender. In some embodiments, bottom wall 14 and exterior side 5 of mounting bracket 10 may be shaped to substantially conform to a shape of a wheelbase or any other desired portion of the fender of a vehicle. As in some embodiments mirror mounting assembly 100 may be mounted, for example, to the fender in a location forward of center above the wheelbase, the side wall closer to the front of the vehicle may be longer from top to bottom than the side wall closer to the rear of the vehicle. Alternatively, in some embodiments the side wall closer to the front of the vehicle may be shorter from top to bottom than the side wall closer to the rear of the vehicle due to the desired mounting location, such as, for example, in a location close to the top edge of a fender of a vehicle with a downward sloping hood from back to front and a correlating fender. Therefore, in some embodiments mounting bracket 10 may comprise a substantially right-angled trapezoidal shape. It is to be understood that other shapes are also possible, such as, for example, rectangular, square, circular, oval, triangular, or any other suitable shape, and one consideration for the approximate shape of mounting bracket 10 is conformity with the fender and/or hood and/or wheelbase of the vehicle to which the mirror mounting assembly is attached.

As shown in FIG. 5B, in some embodiments, the four walls 12, 13, 14, and 15 and exterior side 5 of mounting bracket 10 together form a concave shaped backing when viewed from behind. In some embodiments, the four walls 12, 13, 14, and 15 are shaped so as to allow the back of mounting bracket 10 to substantially conform to the contour of a fender of the vehicle. As such, one or more walls, or portions of one or more walls (for example top wall 15) may extend further away from exterior side 5 than other walls, in order to compensate for any sloping shapes, curvatures and/or indents in the fender.

In some embodiments, mounting bracket 10 has a concave shaped backing. In alternative embodiments, mounting bracket 10 can have either a sixth back wall, alternative shaped backing, and/or the entire mounting bracket 10 can be of a substantially solid form with no concavity. Additionally, while mounting bracket 10 has four walls and a front portion, in some alternative embodiments, mounting bracket 10 may be constructed of one contiguous piece of die cast aluminum. Alternatively, mounting bracket 10 can be made of sand cast aluminum or any other durable material strong enough to properly support a mirror and mirror support arm.

As can be seen in FIG. 5B, in some embodiments mounting bracket 10 further comprises one or more separate areas for fastening mounting bracket 10 to a vehicle and/or other brackets, such as, for example, first connection area 1 and second connection area 2. In some embodiments, first connection area 1 is located at top wall 15 of mounting bracket 10, and includes, for example, one or more downward-facing apertures 16 configured to receive fasteners, such as screws 6 (see FIG. 3), and to be fastenable to a portion of mounting support bracket 10. In alternative embodiments, more or less apertures may also be used depending on the mounting location and/or necessity. As stated herein, in some embodiments other and/or multiple types of connection devices and/or adhesives or welding may be used as well. In some embodiments, second connection area 2, may be located on external side 5 or any other suitable location on mounting bracket 10, and may comprise at least one aperture 17 for connecting mounting bracket 10 to the fender.

In some embodiments mounting bracket 10 may further include at least one pass-through aperture, such as aperture 18, for allowing wiring or any other desired object to be passed through a wall of mounting bracket 10. Additionally or alternatively, in some embodiments, a wall of mounting bracket 10 may include an indent or cut-out, such as cut-out 19 on bottom wall 14, which may serve the same purpose as aperture 18.

Figure 6:
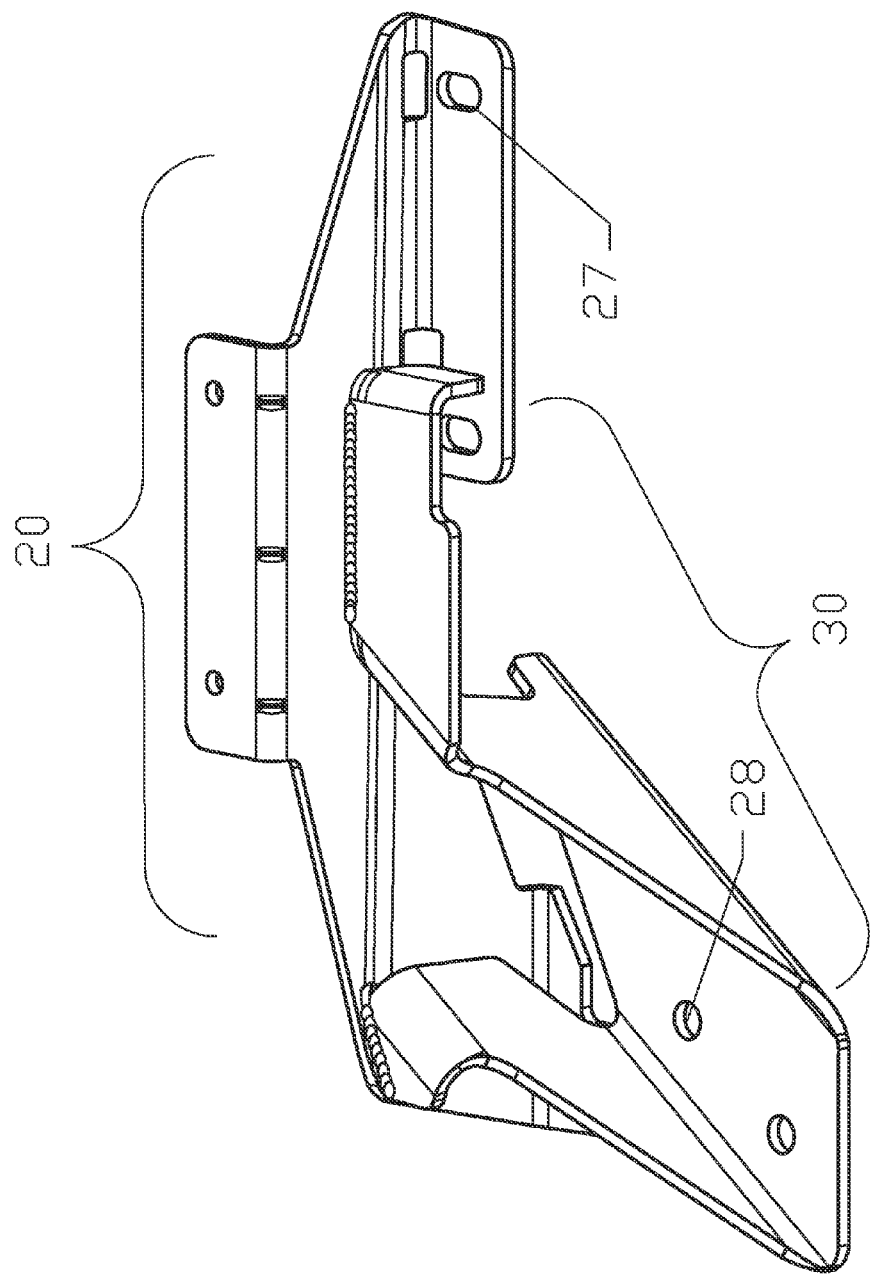
FIGS. 6-7 illustrate front and rear views of a portion of the exemplary embodiments of the mirror mounting assembly of FIGS. 3-4 according to some embodiments of the invention.
Figure 7:
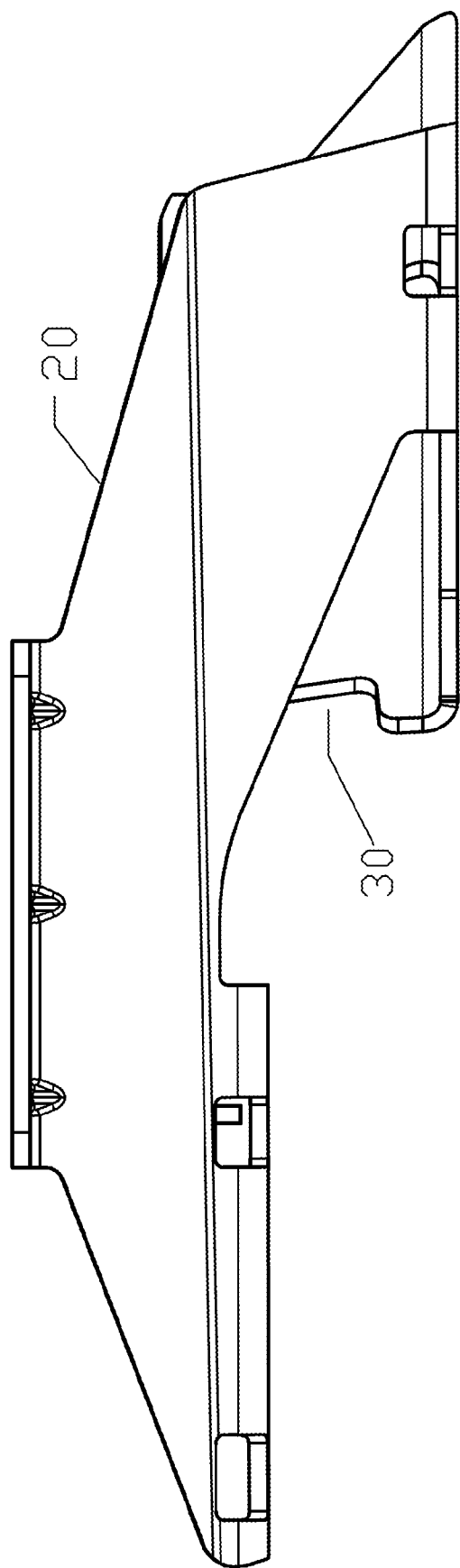
Figure 8:
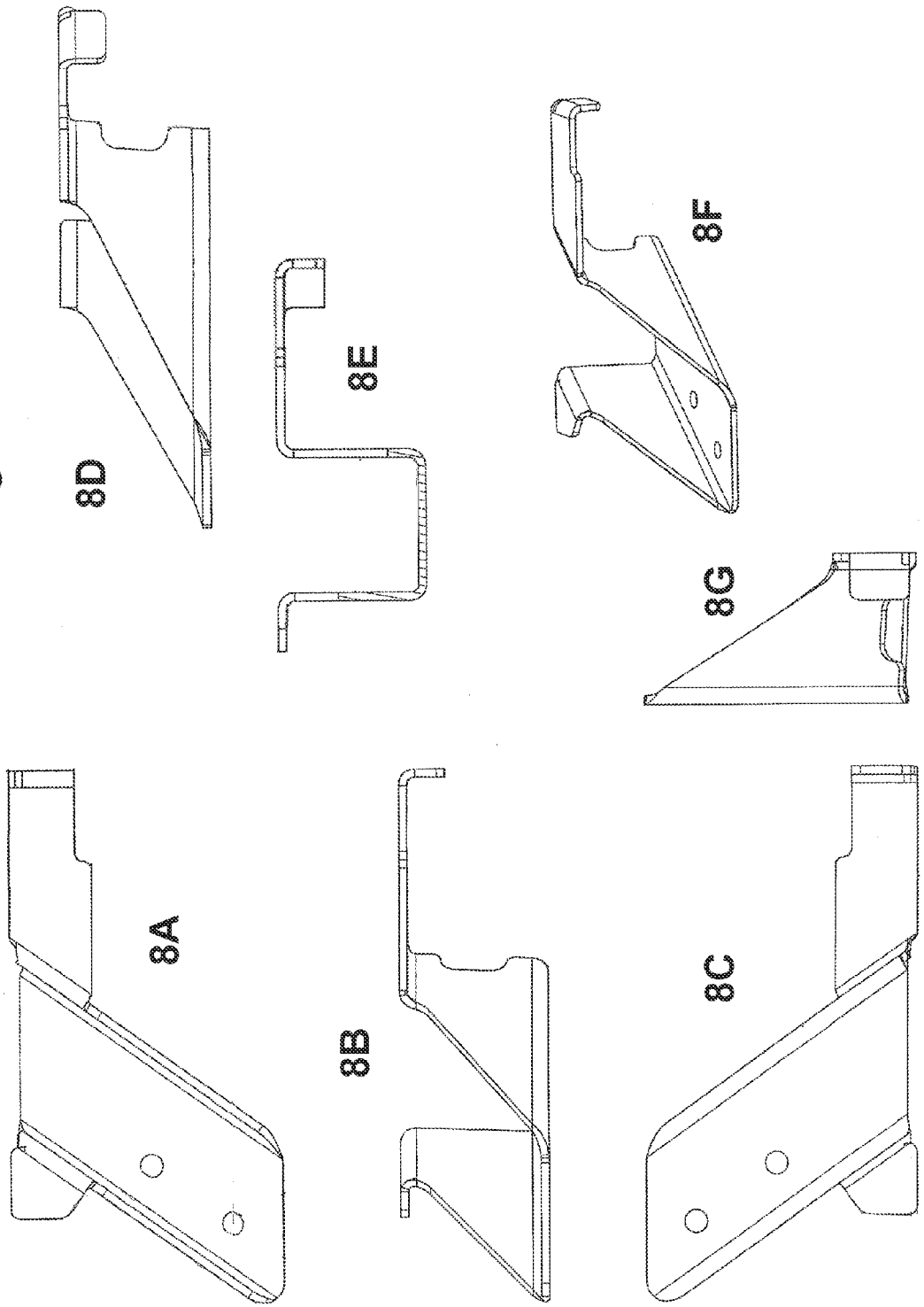
FIGS. 8A-8G are multiple viewing angles of a reinforcement bridge according to some embodiments of the invention.

FIGS. 6 and 7 are front and rear views respectively of mounting support bracket 20 and reinforcement bridge 30 according to some embodiments of the invention. As can be seen in FIG. 6 and discussed in detail regarding FIGS. 2 and 4, in some embodiments mounting support bracket 20 and reinforcement bridge 30 may be welded or otherwise connected together at one or more locations. Alternatively, in some embodiments mounting support bracket 20 and reinforcement bridge 30 may be one contiguous bracket.

As illustrated in, for example, FIGS. 6 and 7, in some embodiments, mounting support bracket 20 has a substantially elongated shape, a proximal portion 21, a distal portion 22, a lower section 23, an upper section 24 at least one flange 25 extending laterally outward from upper section 24, and at least one flange 26 extending laterally from lower section 23 on mounting support bracket 20. In some embodiments the at least one flange 26 comprises third connection area 3. Third connection area 3 may include, for example, one or more apertures 27, such as one at distal portion 21 and one at proximal portion end 22. The proximal and distal end apertures 27 may be appropriately spaced to generally align with and be fastenable to either existing fasteners on the top side of the frame of the vehicle and/or other fasteners that may be used to connect to the top side of the frame. Additional and/or fewer alternative apertures can be optionally included along mounting support bracket 20 to optimize connection of mounting support bracket 20 to the frame. Likewise, other attachment devices are also possible, such as the introduction of additional fasteners not previously fastened to the frame, and/or welding top support bracket directly to the frame.

In some embodiments, flange 25 of mounting support bracket 20 may extend substantially from a center point along mounting support bracket 20 between proximal portion 22 and distal portion 21, or may be located closer to either portion, and extends in the direction of an outer side of the structural portion of the vehicle. Flange 25 may alternatively extend from any portion of mounting support bracket 20 that enables proper fastening of third connection area 3 to the frame while also allowing for proper connection to mounting bracket 10. In some embodiments, flange 25 may be shaped as a Z or S to facilitate connection to bracket 10 and/or mounting support bracket 20. In some embodiments, additional flanges may be employed to facilitate the connection of flange 25 to bracket 10 and/or mounting support bracket 20, reinforcement bridge 30, and/or the vehicle. In some embodiments, flange 25, bracket 10, mounting support bracket 20, and/or reinforcement bridge 30 may include additional sections to facilitate a stable connection. As can be seen in FIG. 6, in some embodiments, flange 25 comprises fourth connection area 4, which, in some embodiments, comprises one or more apertures configured to receive fasteners and to be fastenable to first connection area 1 of mounting bracket 10. Flange 25 may be positioned and/or configured so as to be at least partially insertable into the concave backing of mounting bracket 10, wherein a fourth connection area 4 may be alignable with, and fastenable to, first connection area 1 at an underside of top wall 25 of mounting bracket 10.

In some embodiments, as described in detail regarding FIG. 2, reinforcement bridge 30 In some embodiments, reinforcement bridge 30 is shaped in any manner that facilitates the support of support bracket 20 and provides sufficient support of support bracket 20. For example, in some embodiments, reinforcement bridge 30 has a U-like shape, wherein first and second reinforcement portions 31 and 32, and base portion 33 comprise the three sides of the U-like shape. In some embodiments, first and/or second reinforcement portions 31 and 32 may include additional wings and/or flanges, as, for example, wings 34 and/or 35, and/or apertures (not shown) for adding additional support. In some embodiments, wings 34 and 35 may be the same length and/or shape, or different lengths and/or shapes to provide maximum support to support bracket 20 and mounting bracket 10. In alternative embodiments, the additional wings are not used, or any number of wings may be used. In still further embodiments, reinforcement bridge 30 is shaped, for example, as an L, Z or C or any other suitable shape to provide adequate support. In some embodiments, reinforcement bridge 30 is connected to both support bracket 20 and a portion of the vehicle such as the radiator. In some embodiments, reinforcement bridge 30 is connected to the radiator or other portion of the vehicle via an aperture such as aperture 28, but is not required to be connected to the bracket to provide support. In some embodiments, reinforcement bridge 30 is connected to a radiator portion via any standard connection, such as screws, bolts, washers, springs, bushings, clamps, plungers, grooves, ferrules, rivnuts, plusnuts, hexnuts, and/or tubes, or any other suitable device, adhesives, welds, and the like.

FIGS. 8A-8G are views of reinforcement bridge 30, shown without mounting support bracket 20, according to some embodiments of the invention.

Figure 9:
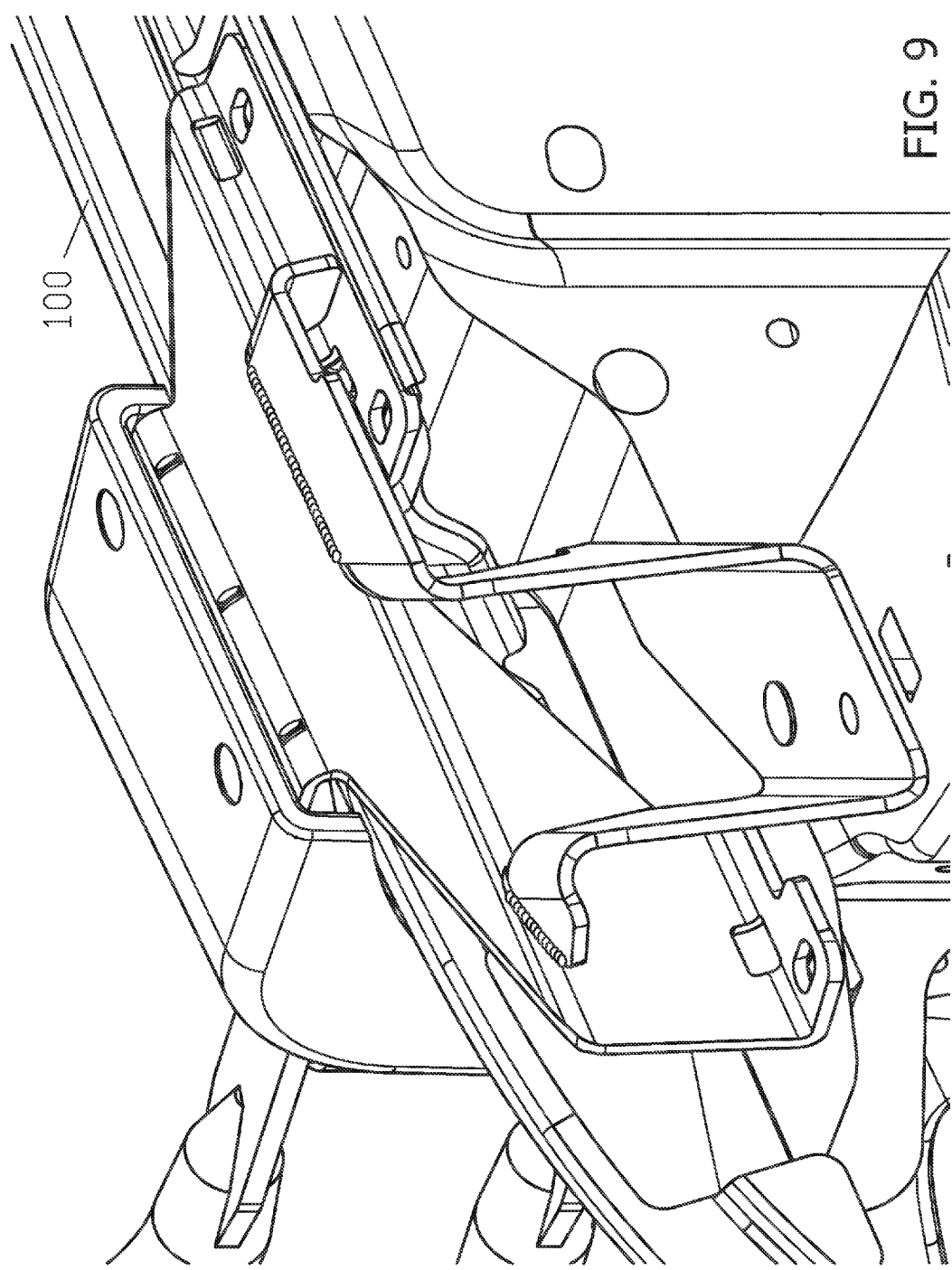
FIG. 9 illustrates a fourth exemplary embodiment of a mirror mounting assembly according to some embodiments of the invention.

FIG. 9 is a view of mirror mount assembly 100 shown mounted to a vehicle, according to some embodiments of the invention. In some embodiments, one or more of the connection areas may either have preformed apertures, apertures created during connection and/or a combination of preformed and non-preformed apertures. Additionally or alternatively, in some embodiments preformed apertures may be threaded and/or reinforced with nuts that may be detachable or welded in place to fortify the apertures and to receive appropriately sized fasteners. Some embodiments may also include a buffer, such as a metallic or rubberized plate or section, placed between connection areas to provide additional support and strength to the mirror mount assembly. Similarly, in some embodiments fasteners and/or connection devices, may including washers, spacers, and/or adhesives for added strength and stability. In some embodiments, any and/or all of these buffers, washers, spacers and adhesives may be permanently or temporarily attached.

Figure 10:
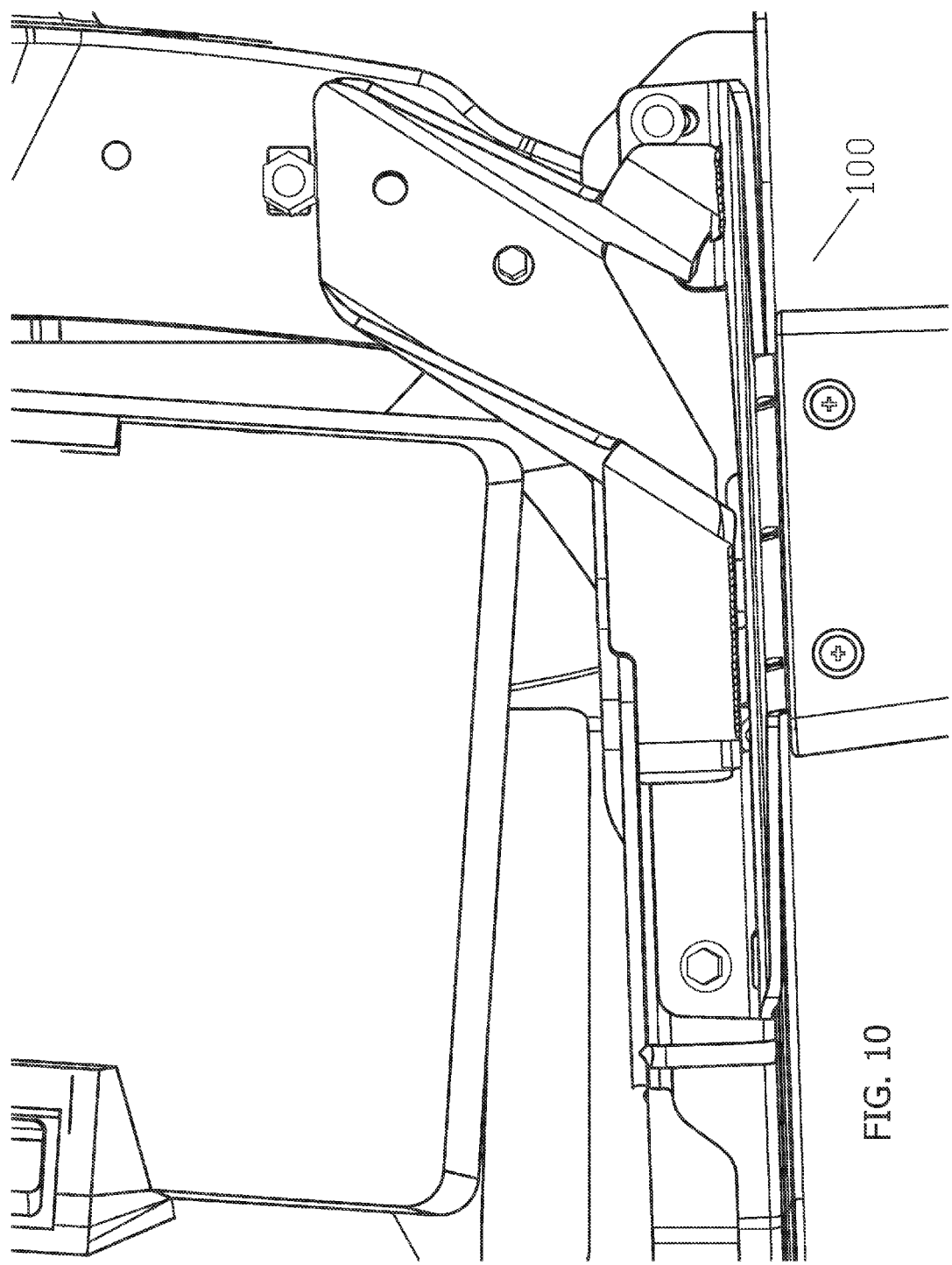
FIG. 10 is a bird's eye view of the exemplary embodiment of the mirror mount assembly of FIG. 9 according to some embodiments of the invention.

FIG. 10 is a bird's eye view of the mirror mount assembly 100 of FIG. 9 shown mounted to a vehicle, according to some embodiments of the invention.

FIG. 11 is a side view of distal portion 21 of mounting support bracket 20 of mirror mount assembly 100 shown mounted to a portion of the fender of a vehicle, according to some embodiments of the invention.

In some embodiments, a method of mounting a mirror mount assembly to a vehicle is provided. In a first exemplary method, an installer opens the hood of the vehicle to the open position or removes the hood from the vehicle, and connect the fifth connection area of mounting support bracket 20 to the sixth connection area of reinforcement bracket 30. The method further includes connecting the first connection area of mounting bracket 10 to the fourth connection area of mounting support bracket 20, configuring mounting bracket 10 so that mounting bracket 10 engages, and is in conformance with, at least a portion of a shape of the fender of the vehicle, and configuring the third connection area of mounting support bracket 20 to be substantially coextensive with a first mounting section of the first structural portion of the vehicle such that the fourth connection area is substantially near an outer side of the structural portion of the vehicle. In some embodiments, the method further includes configuring reinforcement bracket 30 so that the seventh connection area is substantially coextensive with a second structural portion of the vehicle, connecting the third connection area with the at least first mounting section of the first structural portion of the vehicle, connecting the seventh connection area to the section structural portion of the vehicle; and connecting the second connection area of mounting bracket 20 to at least a portion of the fender of the vehicle.

As explained above, in some embodiments, including any methods described herein, the step of connecting the fifth connection area of mounting support bracket 20 to the sixth connection area of reinforcement bracket 30 is performed while at a manufacturing factory or at any point prior to installation. Likewise, in some embodiments the step of connecting the first connection area of mounting bracket 10 to the fourth connection area of mounting support bracket 20 may also be performed at any point prior to installation. In some embodiments, a connecting step may comprise fastening via bolts, screws, nuts, hooks and/or any other suitable connection device, or may comprise applying adhesives, welding, snap-fitting or any other method of connecting suitable for the application.

In a second exemplary method, an installer connects mounting support bracket 20 to reinforcement bracket 30, connects mounting bracket 10 to mounting support bracket 20, configures mounting bracket 10 so that mounting bracket 10 engages, and is in conformance with, at least a portion of a shape of the fender of the vehicle, and configures mounting support bracket 20 to be substantially coextensive with a first structural area of the vehicle. The method further includes configuring reinforcement bracket 30 to be substantially coextensive with a second structural area of the vehicle, connecting mounting support bracket 20 to the first structural portion of the vehicle, connecting reinforcement bracket 30 to a second structural portion of the vehicle, and connecting mounting bracket 10 to at least one of: a portion of the fender of the vehicle and through an exterior portion of the fender of the vehicle to another connection area.

It is of course to be understood that any given steps recited in any methods described herein can be sequential, non-sequential and/or sequence independent steps. For example, in any contemplated method of installing the mirror mount assembly, the step of connecting first connection area 1 of mounting bracket 10 and fourth connection area 4 of mounting support bracket 20 can be performed during factory assembly or at any point prior to installation.

Alternative embodiments of the above methods can include at least any combination of the following additional steps: installing support shafts as described above; pre-drilling required apertures or drilling during installation; assuring that the hood closes properly of the engine bay when the mirror mount assembly is properly installed (as seen in FIG. 1; and welding or otherwise connecting any of the aforementioned connection area to each other and/or to the frame of the vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated. For example, further insubstantial approximations of the above equations are also considered within the scope of the processes described herein.

What is claimed is:

1. A mirror mounting assembly for mounting a mirror to a vehicle, the mirror mounting assembly comprising:
    a mounting bracket including a front portion, a left side wall, a right side wall, a top wall, and a bottom wall, wherein the top wall includes a first connection area, the front portion includes a second connection area and a mirror pivot mechanism configured to directly and pivotally accommodate a mirror mounting arm carrying the mirror, wherein the front portion, the left side wall, the right side wall, the top wall, and the bottom wall together form a concave back portion;
    a mounting support bracket having a third connection area configured to connect said mounting support bracket to a first structural portion of the vehicle, a fourth connection area configured to connect to the first connection area of said mounting bracket, and a fifth connection area, wherein the fourth connection area comprises a flange extending substantially laterally from a side of the mounting support bracket such that a portion of the flange extends in a direction of an outer side of the vehicle and inserted into and directly connected to the concave back portion of the mounting bracket; and
    a reinforcement bracket comprising a sixth connection area directly connected to the fifth connection area of the mounting support bracket, wherein at least a portion of said reinforcement bracket is configured to be positioned at a location below a level of a hood of the vehicle, and a seventh connection area configured to connect to a second structural portion of the vehicle.

2. The mirror mounting assembly of claim 1, wherein the concave back portion is generally shaped to a contour of a portion of a fender of the vehicle.

3. The mirror mounting assembly of claim 2, wherein the fourth connection area is fastenable to an underside of the top wall at the first connection area.

4. The mirror mounting assembly of claim 1, wherein the mounting support bracket comprises a substantially elongated shape, a proximal end and a distal end, and wherein the third connection area is located one of at the proximal end and at the distal end of the mounting support bracket.

5. The mirror mounting assembly of claim 1, wherein the reinforcement bracket comprises at least a first reinforcement segment and a second reinforcement segment.

6. The mirror mounting assembly of claim 5, wherein the first and second reinforcement segments are substantially perpendicular in orientation, wherein the reinforcement bracket further comprises at least a third reinforcement segment, the third reinforcement segment being substantially parallel to the first reinforcement segment.

7. The mirror mounting assembly of claim 1, further comprising a first fastener configured to connect the first connection area to the fourth connection area, a second fastener configured to connect the third connection area to the first structural portion of the vehicle, and a third fastener configured to connect the seventh connection area to the second structural portion of the vehicle.

8. The mirror mounting assembly of claim 1, wherein the mounting support bracket and the reinforcement bracket are one of integral, welded, and permanently connected to one another.

9. The mirror mounting assembly of claim 1, wherein said mounting support bracket further comprises an eighth connection area configured to connect said mounting support bracket to at least one of the first structural portion of the vehicle and a third structural portion of the vehicle.

10. The mirror mounting assembly of claim 1, wherein said mounting support bracket is configured to connect from an exterior of the vehicle through a body panel to the first structural portion of the vehicle, and said reinforcement bracket is configured to connect to the second structural portion from an interior of the vehicle.

11. The mirror mounting assembly of claim 1, wherein the seventh connection area is further configured to be positioned below the level of the hood of the vehicle.

12. The mirror mounting assembly of claim 1, wherein the reinforcement bracket is configured to connect to the mounting support bracket at the location below the level of the hood of the vehicle.

13. A system for mounting a mirror to a vehicle, the system comprising:
- a mounting bracket including a front portion, a left side wall, a right side wall, a top wall, and a bottom wall, wherein the front portion includes a mirror pivot mechanism configured to directly and pivotally accommodate a mirror mounting arm carrying the mirror, wherein the front portion, the left side wall, the right side wall, the to wall, and the bottom wall together form a concave back portion;
- a mounting support bracket including a flange, configured to connect to a first structural portion from an interior of the vehicle, and connected to said mounting bracket, the flange extending substantially laterally from a side of the mounting support bracket such that a portion of the flange extends in a direction of an outer side of the vehicle and configured to be inserted into the concave back portion of the mounting bracket; and
- a reinforcement bracket comprising a U-shaped channel including a first vertical side wall, a second vertical side wall, a lateral wall connecting the first and second vertical side walls, wherein the reinforcement bracket is configured to connect to a second structural portion of the vehicle and configured to connect to said mounting support bracket, wherein at least a portion of the reinforcement bracket is configured to be positioned at a location below a level of a hood of the vehicle, wherein the reinforcement bracket provides support to said mounting support bracket, and wherein when installed said mounting bracket is directly connected to said mounting support bracket and said mounting support bracket is directly connected to said reinforcement bracket.

14. The system of claim 13, wherein the concave back portion is generally shaped to a contour of a portion of a body panel of the vehicle.

15. The system of claim 14, wherein the mounting support bracket comprises a substantially elongated shape, an upper portion comprising the flange, and a lower portion; wherein the lower portion is positioned and configured so as to be connectable to the second structural portion of the vehicle.

16. The system of claim 13, further comprising a first fastener configured to connect the mounting bracket to the mounting support bracket, a second fastener configured to connect the mounting support bracket to the first structural portion of the vehicle, a third fastener configured to connect the reinforcement bracket to the second structural portion of the vehicle, and a fourth fastener configured to connect the mounting bracket to a portion of a fender of the vehicle.

17. The system of claim 13, wherein the mounting support bracket and the reinforcement bracket are one of integral, welded, and permanently connected to each other.

18. The system of claim 13, wherein said mounting support bracket is further configured to connect said mounting support bracket to at least one of a second area along the first structural portion of the vehicle and a third structural portion of the vehicle.

19. The system of claim 13, wherein said mounting support bracket is configured to connect from an exterior of the vehicle to the first structural portion in the interior of the vehicle, and said reinforcement bracket is configured to connect to the second structural portion in the interior of the vehicle.

20. The system of claim 13, wherein the mounting support bracket is configured to connect to a top side of the first structural portion of the vehicle directly.

21. The system of claim 13, wherein the reinforcement bracket is configured to connect to the mounting support bracket at the location below the level of the hood of the vehicle.

22. A system for mounting a mirror to a vehicle having a hood, the system comprising:
- a mounting bracket including a front portion and a back portion, wherein the front portion includes a mirror pivot mechanism configured to directly and pivotally accommodate a mirror mounting arm carrying the mirror;
- a mounting support bracket configured to connect to at least one of a first structural portion and a first skeletal structure within a vehicle body comprising a first location of reduced vibration, and configured to be connected to said mounting bracket, and said mounting support bracket comprising a flange extending substantially laterally from the mounting support bracket such that a portion of the flange extends in a direction of a side of the vehicle and configured to be inserted into the back portion of the mounting bracket; and
- a reinforcement bracket comprising a U-shaped channel including a first vertical side wall, a second vertical side wall, a lateral wall connecting the first and second vertical side walls, and configured to connect to a second structural portion or a second skeletal structure within the vehicle body comprising a second location of reduced vibration and providing support to said mounting support bracket, and configured to connect to said mounting support bracket from an interior of the vehicle, and at least a portion of said reinforcement bracket adapted to be positioned within an inner section of the vehicle directly below the hood of the vehicle when the hood is in a closed position, wherein when installed said mounting bracket is directly connected to said mounting support bracket and said mounting support bracket is directly connected to said reinforcement bracket.

23. The system of claim 22, wherein the reinforcement bracket is configured to connect to the mounting support bracket at a location below a level of the hood of the vehicle.

\* \* \* \* \*